United States Patent Office 3,281,206
Patented Oct. 25, 1966

3,281,206
METHOD OF ADDING STABILIZERS TO THE SODIUM CHLORIDE SOLUTION IN THE PRODUCTION OF SODIUM BICARBONATE
Marina Adriana van Damme-van Weele, Hengelo, Netherlands, assignor, by mesne assignments, to Diamond Alkali Company, Cleveland, Ohio, a corporation of Delaware
No Drawing. Filed July 15, 1963, Ser. No. 295,608
Claims priority, application Netherlands, July 19, 1962, 281,184
1 Claim. (Cl. 23—65)

The present invention is based on the discovery of the very remarkable phenomenon that ferrocyanide ions strongly retard the dissolving of solid sodium chloride and/or potassium chloride in water after reaching a concentration which is dependent on the ferrocyanide concentration, on the one hand, and counteract the crystallization of the said chloride from supersaturated solutions, even in the presence of solid sodium chloride and/or potassium chloride, on the other hand. The concentration of the "unsaturated" solutions obtained in the former case increases very slowly indeed after having reached a value which will be referred to hereinafter as "critical unsaturation," so that in practice it is generally possible to speak of, and to take into account only, "the" concentration of critical unsaturation (at a given ferrocyanide ion concentration). In the second case in practice one also generally has to reckon only with "the" concentration of critical supersaturation since the formation of crystal nuclei takes place extremely slowly, as does the growth of any nuclei and crystals present.

The invention makes use of this surprising discovery and relates to a method of obtaining a stabilized state of unsaturation or supersaturation in systems containing sodium chloride and/or potassium chloride. In accordance with the invention the stabilized state of unsaturation or supersaturation is effected in the presence of a ferrocyanide or a state of unsaturation or supersaturation is stabilized by the addition of a ferrocyanide, it being possible, in the case of supersaturation, to use another agent having an anti-caking effect upon solid crystals of these salts when used in a small concentration, as the stabilizing agent instead of a ferrocyanide, with the understanding that in using solid sodium chloride and/or potassium chloride already containing such an anti-caking agent, an additional quantity of stabilizing agent is supplied.

This agent to be supplied additionally need not be the same as the anti-caking agent already present. Otherwise, in using salt not containing any anti-caking agent it is also possible to use a mixture of stabilizing agents for obtaining a stabilized state of supersaturation.

The limitation given at the end of the above paragraph arises from the fact that the addition of ferrocyanide and other compounds to crystals of sodium chloride and potassium chloride so as to reduce the caking tendency is known. In this connection reference can be made to the Dutch specifications 84,368 and 83,112 (ferrocyanides and ferricyanides), the British specification 818,385 (various other complex salts), the Dutch specification 83,128 (cadmium salts) and the British specification 871,456 (nitrilotriacetamide). The discovery underlying the present invention and the concepts regarding the possible uses based thereon cannot be derived at all from the cited specifications.

A stabilized state of unsaturation is to be understood here as a state which can be considered as being stable for practical purposes, wherein solid sodium chloride or potassium chloride is in contact with a solution containing sodium chloride or potassium chloride in a concentration which is less than the concentration obtained under otherwise the same conditions but without the presence of a ferrocyanide, that is to say, in a concentration which is less than that which is the normal concentration in the system under consideration at the temperature in question. Until now such an abnormal state of unsaturation, or pseudoequilibrium, was fully unknown.

A stabilized state of supersaturation is meant herein as a state which can be considered as being stable for practical purposes and which, due to the presence of a stabilizing agent, even remains if the supersaturated liquid phase is or is brought in contact with solid sodium chloride and/or potassium chloride. The abnormal state of supersaturation, or pseudoequilibrium, made possible by the invention also shows the particular character of the phenomena found; as a matter of fact, in the known state of supersaturation which, with certain salts, may sometimes also be maintained during a practically unlimited period, crystallization occurs immediately upon addition of crystal nuclei to the supersaturated solution.

The effect of obtaining an abnormal state of unsaturation is specific for ferrocyanides and appears not to occur when adding other known anti-caking agents. On the other hand, a stabilized state of supersaturation in the sense as meant herein can also be obtained when, as the stabilizing agent, another very active anti-caking agent is used which, like ferrocyanides, already has an anti-caking effect when added to solid salt in a quantity in the order of ten parts per million, such as cadmium salts and nitrilotriacetamide.

For the sake of completeness, reference is made to the Dutch specification 71,768 and the British specification 848,328 which discloses that sodium chloride crystals having particular shapes are obtained when certain compounds, among others ferrocyanides, are added to the brine to be evaporated. The British specification 848,328 mentions (page 1, lines 73–77) that some compounds also suppress nucleation. However, on page 2, lines 19–22, the British specification states that supersaturation created in the brine is dissipated as growth on salt crystals (already present) proceeds. Consequently, it could not be derived from the said specifications, which as noted before relate to the production of special crystal configurations, that a stabilized abnormal state of unsaturation or supersaturation could be obtained by the addition of ferrocyanides (and as far as the supersaturation is concerned also by the addition of other active anti-caking agents).

In carrying out the method according to the invention the stabilizing agent is generally used in an amount of at least $10^{-5}$ g. mol per 100 g. of solvent, the effect produced when using smaller amounts normally being too small for practical purposes.

In a specific embodiment the method according to the present invention may be applied for separating a mixture of soluble compounds containing sodium chloride and/or potassium chloride as one of the components; in this embodiment an aqueous solution is added to the mixture and the solid form of sodium chloride and/or potassium chloride is separated from the liquid phase. In this case the purification is carried out in the presence of a ferrocyanide. As an example of such a purification the aqueous system comprising sodium chloride, sodium sulfate and water may be mentioned. Above a minimum ratio between sodium chloride and sodium sulfate determined by the invariant point of the phase diagram substantially all the sulfate (with part of the chloride) can be dissolved while pure sodium chloride remains as the solid phase. When a ferrocyanide is added to the system the limits of the purification are determined by another invariant point in the phase diagram. The location of this point depends on the critical unsaturation of the system, that is to say on the amount of ferrocyanide. As appears from what has been said hereinbefore, in practice the new invariant point can be considered as a fixed point. The result of the shift of the invariant point is that starting from the same mixture of chloride and sulfate a smaller quantity of water is to be added to the system so as to have left pure sodium chloride as the solid phase and also to obtain a greater amount of solid sodium chloride, on the one hand, and that this purification process can be effected above a minimum ratio between chloride and sulfate which is lower than in the absence of ferrocyanide, on the other hand.

According to another embodiment, the described method can be used for separating a component from an aqueous system containing this component and sodium chloride and/or potassium chloride; in this embodiment the system is evaporated, cooled or subjected to another operation for assuring supersaturation, and the component which is precipitated from the liquid phase is separated from the liquid phase containing sodium chloride and/or potassium chloride, the said operation being carried out in the presence of one or more of the mentioned stabilizing agents. For this embodiment the system sodium chloride/sodium sulfate/water can also be mentioned as an example. Below a certain maximum ratio between chloride and sulfate determined by the invariant point of the phase diagram, sodium sulfate can be caused to crystallize by evaporation of a solution containing both salts, the chloride (and part of the sulfate) remaining dissolved in the liquid phase. In this case too the addition of a stabilizing agent enlarges the possibilities. As a matter of fact, again a shift of the invariant point of the phase diagram is effected but now in dependence upon the critical supersaturation of the sodium chloride. This is to say that by evaporation of the same starting solution to the critical supersaturation point a larger amount of sodium sulfate can be separated as the pure solid phase, and that the maximum ratio between chloride and sulfate is greater than in the absence of a stabilizing agent.

Another example of interest in obtaining a supersaturated solution in a stabilized state can be found in the soda production according to the ammonia-soda process. Therein the yield of the conversion of the NaCl to $NaHCO_3$ can be improved by using a supersaturated NaCl brine which can be produced by evaporating water from the normally used brine in the presence of a ferrocyanide or another stabilizing agent. Then, no crystallization of NaCl occurs below a certain concentration which depends on the ferrocyanide concentration. It was previously known that the yield could be enhanced by raising the brine concentration (see Te-Pang-Hou, Manufacture of Soda, Reinhold Publishing Corporation, New York, 2nd Ed., 1942) but it was not known how to avoid difficulties caused by the crystallization of NaCl, and until now it has not even been feasible to use saturated brine. Due to the present invention it is now possible to use a supersaturated brine, i.e., a brine having such a concentration that normally would be supersaturated at the relevant temperature in the absence of a ferrocyanide.

A practical application of the preparation of an unsaturated solution is the use of water containing a ferrocyanide as the solvent in dissolving underground rock salt formations prior to stopping the brine production for some reason. In this way clogging of the discharge tube of the brine well by crystallization of salt from the brine stream present in this tube is readily prevented, when flow of brine is stopped and then cools to some extent. In this application use is made of the effect of a ferrocyanide in maintaining unsaturation in dissolving the rock salt in the water containing a ferrocyanide.

The effect of unsaturation may also be used in cooling devices wherein brine cooled by means of a refrigeration machine to below 0° C. is pumped through a tube system which withdraws heat from a space which is to be kept at a low temperature, for example, for preserving foods. Controlling the brine concentration is very important in such a system; on the one hand, the concentration must be sufficiently high to prevent ice formation and, on the other hand and during cooling, to prevent crystallization of sodium chloride dihydrate, the solubility of which rapidly decreases with decreasing temperature. The determination and control of the brine concentration means a burden for industries having cooling installations but having no chemical-technical facilities. The addition of a certain amount of ferrocyanide in the preparation of the cooling brine permits, without the use of any other control operation, the production of an unsaturated brine from water and an excess of solid salt, which brine has a suitable concentration, i.e., a concentration which precludes ice formation as well as the crystallization of sodium chloride dihydrate at a predetermined minimum operating temperature.

The discovered phenomena of dissolution and crystallization retardation can also be used, for example, in studying the processes occurring in dissolving and crystalizing, respectively. As a matter of fact, pseudo-equilibrium states of unsaturation or supersaturation can be created by the injection of a suitable amount of ferrocyanide, or in other words, such systems can be brought into a state of unsaturation or supersaturation which in practice may be considered as being stable and suitable for the study of liquid and solid phases.

The following table shows the effect of ferrocyanide concentrations, upon the relative differences of concentrations of unsaturation and supersaturation of sodium chloride and potassium chloride, at 30° C. The percentage values for the relative degrees of unsaturation are given as the difference between the concentration of solute in a normally saturated solution of the solute without added ferrocyanide ($c_s$), and the observed substantially equilibrium solute concentration at the given ferrocyanide concentration in the presence of the solid salt ($c$), divided by the concentration of solute in a normally saturated solution of the solute, the concentrations being expressed in grams of dissolved salt per 100 grams of water. Thus, the degree of unsaturation is given by the formula $$\frac{c_s - c}{c_s} \times 100 = \text{percent difference in concentration}$$

The percentage values of the relative differences in degree of supersaturation are given by the formula $$\frac{c - c_s}{c_s} \times 100 = \text{percent difference in concentration}$$

That is to say, as the relative difference in concentrations between the concentration of the solute which is just short of that at which crystallization occurs in the presence of ferrocyanide, and the concentration of solute at normal saturation without ferrocyanide, is divided by this concentration of solute at normal saturation. The phenomenon of suppressing solubility may also be termed "undersaturation" or degree to which the solution is less than saturated compared with the concentration of solute at normal saturation values.

| G. Fe(CN)$_6$'''' per 100 g.H$^2$O | NaCl | | KCl | |
|---|---|---|---|---|
| | Under-sat., percent | Supersat., percent | Under-sat., percent | Supersat., percent |
| 0.033 | 7 | 13.3 | 5.6 | about 15 |
| 0.10 | 9.7 | 18.0 | 6.7 | about 20 |
| 0.30 | 14.6 | 23.8 | 7.2 | about 23 |
| 0.90 | 21.3 | | 9.6 | |

At 30° C. the value of $c_s$ is 36.0 grams of dissolved salt per 100 grams of water for NaCl and 37.4 grams for KCl. From the above definition of the under-saturation values given it will be understood that a higher value means a lower concentration in the solution. Thus, the under-saturation value of 7% corresponds with a concentration of 33.5 grams of NaCl per 100 grams of water, while the value of 9.7% corresponds with a concentration of 32.5 grams.

At higher and lower temperatures occurring in practice the effect of the addition is of the same order. However, in this respect it should be remarked that with NaCl at temperatures lower than about 15° C. one cannot have the full benefit of the maximum supersaturation given by the solubility of the ferrocyanide at the relevant temperature. This is due to the fact that at low temperatures the dihydrate, $NaCl \cdot 2H_2O$, can crystallize in a metastable state. Thus, for example, the supersaturation which can be reached in reality is about 10% at 10° C.

Regarding the supersaturation to be obtained with other active anti-caking agents, it may be remarked, for example, that the supersaturation when using cadmium chloride is about 7% at 0.008 g., about 9.4% at 0.08 g., and about 9.7% at 0.24 g., and when using nitrilotriacetamide 8% at 0.01 g., 14% at 0.045 g. and 25% at 0.18 g., the amounts by weight again being calculated on 100 g. of $H_2O$.

In using a ferrocyanide as the stabilizing agent it is important only that ferrocyanide ions are present in the liquid phase of the system in question, the nature of the cation being immaterial. In general, alkali metal ferrocyanides will be used. However, in certain cases it may be preferred to use an excess of a ferrocyanide which is slightly soluble only in a solution of sodium chloride or potassium chloride or which gives a slightly soluble double salt therewith. Then a certain relatively small degree under-saturation or supersaturation is obtained without the necessity of using an accurate dose of the ferrocyanide. The same is true for the use of ferrocyanides which dissolve as a colloid. These compounds also give the effect of under-saturation or supersaturation but the amount required for effecting a certain degree under-saturation or supersaturation is generally larger than the amount which can be derived from the table given hereinbefore. Instead of the ferrocyanides themselves compounds forming ferrocyanides having a molecular or colloidal solubility under the conditions of the method can also be used.

*Example I*

This example demonstrates the separation of a salt mixture comprising 90% of NaCl and 10% of $Na_2SO_4$ into the pure components by means of a simple cyclic process.

To a mixture of 77.5 g. of NaCl and $Na_2SO_4$, containing 7.75 g. of the latter compound, are added 100 g. of a solution (designated B) having the following composition:

0.32 g. of $Na_4Fe(CN)_6$
67.0 g. of $H_2O$
27.9 g. of NaCl
4.75 g. of $Na_2SO_4$ and a slurry of the solids in water results. The slurry is kept at 33° C. Water is added in two steps, 22 g. in the first step and 10 g. in the second. After reaching the pseudoequilibrium state the total amount of $Na_2SO_4$ has been dissolved while the total amount of NaCl contained in the mixture of solids remains as a solid and is separated from the solution.

The liquid phase (designated Solution A) is evaporated at a constant temperature of 33° C. until 32 g. of water has been evaporated. Thereby 7.75 g. of $Na_2SO_4$ crystallizes out of the solution while the total amount of NaCl contained in the solution remains dissolved. The liquid phase having the composition of the solution designated B hereinbefore, is separated from the crystallized $Na_2SO_4$ and added to 77.5 g. of the salt mixture, whereupon the cycle is completed.

In dissolving the $Na_2SO_4$ into the mixture of Solution B and the water added in the first operation of the cyclic process the effect of under-saturation on the presence of a ferrocyanide plays a role, whereas the effect of supersaturation is used in evaporating Solution A. A favorable circumstance is that the ferrocyanide added is not consumed since it remains in the liquid phase.

Without the presence of a ferrocyanide the above cyclic process cannot be carried out. To separate 42 g. of pure NaCl, 84 g. of water is added to 77.5 g. of the salt mixture. However, no $Na_2SO_4$ free from NaCl can be separated by evaporation at constant temperature from the remaining solution containing all the $Na_2SO_4$ and 37.8 g. of NaCl.

*Example II*

In a soda ash plant operating according to the conventional ammonia-soda process the purified brine to be reacted contains about 9.70 mol. of water per mol. of NaCl. After absorption of ammonia and carbonation of the ammoniacal brine about 74% of the sodium present in the feed brine is precipitated in the form of bicarbonate.

However, if about 0.04% by weight based on the brine of sodium ferrocyanide (corresponding to 0.038 gram of ferrocyanide ions per 100 grams of water contained in the brine) is added to the purified brine and if thereafter about 21% of the water present is evaporated, a supersaturated solution having a sufficient stability and containing 7.66 mol. of water per mol. of NaCl is obtained. When using this supersaturated brine about 79.5% of the sodium is precipitated as $NaHCO_3$. Consequently, calculated on the basis of the concentration in the purified brine, about 5.5% per ton of soda ash produced is saved.

Expressed per cubic meter (1 cubic meter=264.173 gallons U.S.) of feed brine the production of soda is increased by about 36%; in other words, the capacity of a given installation is greatly enhanced by using the effect of supersaturation.

Still greater advantages, in particular regarding the energy consumption, can be reached in the production of soda ash while simultaneously recovering ammonium chloride from the mother liquor of the sodium bicarbonate crystallization.

*Example III*

In a bore hole made into a rock salt deposit there are two concentric tubes; the outer tube reaches to 1100 meters below the surface, the inner tube to 900 meters. Water is pumped in through the inner tube; there, it dissolves salt and brine rises through the outer tube. After the formation of a cavity of sufficient dimensions in the rock salt the brine is not yet fully saturated at the temperature prevailing at the surface if 50 cubic meters of water per hour are pumped in. If pumping is restarted after stopping for 24 hours, salt is deposited from the brine in the outer tube due to cooling, which brine has now become substantially saturated at the temperature prevailing at the mentioned depth, whereby the circulation is impeded. The salt deposition can be prevented by a preliminary addition of 0.0002 g. mol. of sodium ferrocyanide per liter to the water used; by this measure the brine produced is still slightly unsaturated, even after a stop. In case the ferrocyanide content might cause any difficulty in the processing of the brine the ferrocyanide can be precipitated or decomposed in a manner known per se.

*Example IV*

For the purpose of preparing brine for a cooling device an excess of common salt is contacted with an aqueous solution containing 0.22% of $K_4Fe(CN)_6 \cdot 3H_2O$. There is formed a brine having a NaCl concentration of about 24.3% and which can be cooled down to $-15°$ C. without any precipitation of solids. In a portion of the circuit the brine can be kept in contact with solid salt so that in case of dilution, for example by the condensation of water vapor, an automatic adjustment of the initial concentration occurs. Even at low temperatures the solid salt is not converted into sodium chloride dihydrate; otherwise a hard mass would be formed.

What is claimed is:

In a process of producing sodium bicarbonate according to the ammonia-soda process, comprising contacting a feed brine with ammonia gas and with carbon dioxide in amounts sufficient to form a solid phase consisting essentially of sodium bicarbonate, and separating said solid phase from the liquid phase, the improvement which comprises preparing said feed brine by (1) forming an aqueous solution of sodium chloride and a stabilizer dissolved therein in an amount between 0.008 gram and 0.30 gram per 100 g. of water and selected from the group consisting of alkali metal ferrocyanides, cadmium chloride and nitrilotriacetamide, and (2) evaporating water from said solution to a degree sufficient to bring said solution into a state of supersaturation with respect to sodium chloride but insufficient to effect crystallization of sodium chloride.

References Cited by the Examiner

UNITED STATES PATENTS

| | | | |
|---|---|---|---|
| 1,710,636 | 4/1929 | Gluud et al. | 23—65 |
| 2,108,377 | 2/1938 | Heimbach | 23—300 |
| 2,642,335 | 6/1953 | May et al. | 23—300 X |
| 3,000,708 | 9/1961 | Kapsenberg | 23—89 X |
| 3,090,756 | 5/1963 | Kaufmann | 252—70 X |

FOREIGN PATENTS

| | | |
|---|---|---|
| 243,677 | 5/1926 | Great Britain. |
| 848,328 | 9/1960 | Great Britain. |

OSCAR R. VERTIZ, *Primary Examiner.*

BENJAMIN HENKIN, *Examiner.*

G. OZAKI, *Assistant Examiner.*